United States Patent
Jurzak (10) Patent No.: US 12,335,661 B2
(45) Date of Patent: Jun. 17, 2025

(54) CONTROLLED ABSENCE OF MOVING OBJECTS FROM THE FIELD OF VIEW OF A CAMERA DURING A TIME PERIOD

(71) Applicant: MOTOROLA SOLUTIONS, INC., Chicago, IL (US)

(72) Inventor: Pawel Jurzak, Cracow (PL)

(73) Assignee: MOTOROLA SOLUTIONS INC., Chicago, IL (US)

( * ) Notice: Subject to any disclaimer, the term of this patent is extended or adjusted under 35 U.S.C. 154(b) by 182 days.

(21) Appl. No.: 18/458,424

(22) Filed: Aug. 30, 2023

(65) Prior Publication Data

US 2025/0080697 A1 Mar. 6, 2025

(51) Int. Cl.
*H04N 7/18* (2006.01)
*G07C 9/00* (2020.01)
*H04N 23/611* (2023.01)
*H04N 23/667* (2023.01)

(52) U.S. Cl.
CPC ........... *H04N 7/18* (2013.01); *G07C 9/00563* (2013.01); *H04N 23/611* (2023.01); *H04N 23/667* (2023.01); *G07C 2209/62* (2013.01)

(58) Field of Classification Search
None
See application file for complete search history.

(56) References Cited

U.S. PATENT DOCUMENTS

| | | | |
|---|---|---|---|
| 9,008,607 B2 | 4/2015 | Ibbotson | |
| 9,270,893 B2 | 2/2016 | Nystrom | |
| 9,607,501 B2 * | 3/2017 | English | H04N 23/90 |
| 10,117,309 B1 * | 10/2018 | Fu | H04N 23/661 |
| 11,036,488 B2 | 6/2021 | Marzorati et al. | |
| 11,354,994 B1 * | 6/2022 | Staudacher | G08B 13/196 |
| 2005/0232624 A1 * | 10/2005 | Baldwin | G03B 7/26 396/278 |
| 2015/0055830 A1 | 2/2015 | Datta et al. | |
| 2017/0257602 A1 * | 9/2017 | Axson | G08B 13/19689 |
| 2018/0322751 A1 * | 11/2018 | Sacre | H04N 23/74 |
| 2018/0338119 A1 * | 11/2018 | Hoffman | H04L 65/1089 |
| 2018/0359405 A1 * | 12/2018 | Clayton | H04N 7/181 |
| 2019/0289194 A1 * | 9/2019 | Cha | H04N 23/90 |
| 2020/0151061 A1 | 5/2020 | Vos et al. | |

(Continued)

OTHER PUBLICATIONS

Yong, Jia Wen et al.: "Method and Apparatus for Upgrading a Camera", U.S. Appl. No. 18/297,672, filed Apr. 10, 2023, all pages.

*Primary Examiner* — Stefan Gadomski (57) ABSTRACT

A method and system for controlled absence of moving objects from the field of view of a camera during a defined time period is disclosed. When data generated by an at least one electronics device or a respective controller thereof confirms that the physical environment requirements of the at least one electronics device will be met, or confirms that the at least one electronics device will be controlled to meet the operational requirements, the video camera is allowed to enter a mode where the capturing of the video is impeded during the time period. Conversely, when the data indicates that the physical environment requirements will not be met, or that the at least one electronics device will not be controlled to meet the operational requirements, the system ensures that the capturing of the video is not impeded during the time period.

20 Claims, 5 Drawing Sheets

(56) References Cited

U.S. PATENT DOCUMENTS

| | | |
|---|---|---|
| 2020/0228692 A1* | 7/2020 | Wakamatsu ......... H04N 23/695 |
| 2020/0293180 A1 | 9/2020 | Pani |
| 2021/0020022 A1* | 1/2021 | Hutz ...................... G06V 20/40 |
| 2021/0034671 A1 | 2/2021 | Lemay et al. |
| 2021/0081712 A1* | 3/2021 | Saunders .............. G06F 18/214 |
| 2021/0158542 A1* | 5/2021 | Khan ............... G08B 13/19693 |
| 2021/0271912 A1* | 9/2021 | Wu .......................... G06N 3/08 |
| 2021/0319223 A1* | 10/2021 | Nagata ................ G06V 10/764 |
| 2023/0362472 A1* | 11/2023 | Wakamatsu ......... H04N 23/687 |
| 2024/0045565 A1* | 2/2024 | Cho ....................... G16Y 40/10 |
| 2024/0048670 A1* | 2/2024 | Chaurasia .............. H04N 7/183 |
| 2024/0174085 A1* | 5/2024 | Böhm .................... B60K 35/29 |
| 2024/0338205 A1* | 10/2024 | Yong ........................ G06F 8/65 |
| 2025/0050874 A1* | 2/2025 | Beinborn ............. B60W 30/09 |

\* cited by examiner

CONTROLLED ABSENCE OF MOVING OBJECTS FROM THE FIELD OF VIEW OF A CAMERA DURING A TIME PERIOD

BACKGROUND

Security systems typically employ video cameras (or other devices or sensors for image capturing) to collect image data such as videos. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In addition to the security system that includes one or more video cameras, a security system can also include access control apparatus. In this regard, ensuring that only authorized individuals can access protected or secured areas may be crucially important (for example, at an airport, a military installation, office building, etc.). Protected or secured areas may be defined by physical doors (e.g., doors through which a human may enter) and walls, or they may also be virtually defined in other ways. For instance, a protected area may be defined as one in which unauthorized entry causes a detector to signal intrusion and optionally send a signal or sound an alarm either immediately or if authorization is not provided within a certain period of time.

Access control apparatus may limit entry into protected or secured areas of buildings, rooms within buildings, real property, fenced-in regions, or assets and resources therein, to only those individuals who have permission to enter. Thus, an access control system should identify the individual attempting to enter the secured area, and verify that the individual is currently authorized to enter.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes ascertaining a time period, defined by both a future start time and a future end time, for when a video camera, having a Field Of View (FOV), will be potentially impeded from capturing video. The computer-implemented method also includes determining, using an least one processor and based on a known cause and effect relationship between the video camera and an at least one electronics device within a security system, operational requirements or physical environment requirements of the least one electronics device which when satisfied are expected to support a controlled absence of moving objects from the FOV within the time period. The computer-implemented method also includes receiving data generated by the at least one electronics device or a respective controller thereof. When the data confirms that the physical environment requirements will be met or confirms that the at least one electronics device will be controlled to meet the operational requirements, the video camera is allowed to enter a mode where the capturing of the video is impeded during the time period. When data indicates that the physical environment requirements will not be met or that the at least one electronics device will not be controlled to meet the operational requirements, ensuring that the capturing of the video is not impeded during the time period.

In accordance with another example embodiment, there is provided an apparatus that includes at least one processor configured to receive data generated by an at least one electronics device within a security system, or generated by a respective controller of the at least one electronics device. The apparatus also includes a video camera having a Field Of View (FOV) and communicatively coupled to the at least one processor. The apparatus also includes at least one electronic storage medium storing program instructions that when executed by the at least one processor cause the at least one processor to perform ascertaining a time period, defined by both a future start time and a future end time, for when the video camera will be potentially impeded from capturing video. The at least one processor is also caused to perform determining, based on a known cause and effect relationship between the video camera and the at least one electronics device, operational requirements or physical environment requirements of the least one electronics device which when satisfied are expected to support a controlled absence of moving objects from the FOV within the time period. When the data confirms that the physical environment requirements will be met or confirms that the at least one electronics device will be controlled to meet the operational requirements, the video camera is allowed to enter a mode where the capturing of the video is impeded during the time period. When the data indicates that the physical environment requirements will not be met or that the at least one electronics device will not be controlled to meet the operational requirements, the executed program instructions include instructions for ensuring that the capturing of the video is not impeded during the time period.

Each of the above-mentioned embodiments will be discussed in more detail below, starting with example system and device architectures of the system in which the embodiments may be practiced, followed by an illustration of processing blocks for achieving an improved technical method, device, and system for a controlled absence of moving objects from the field of view of a camera during a time period.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
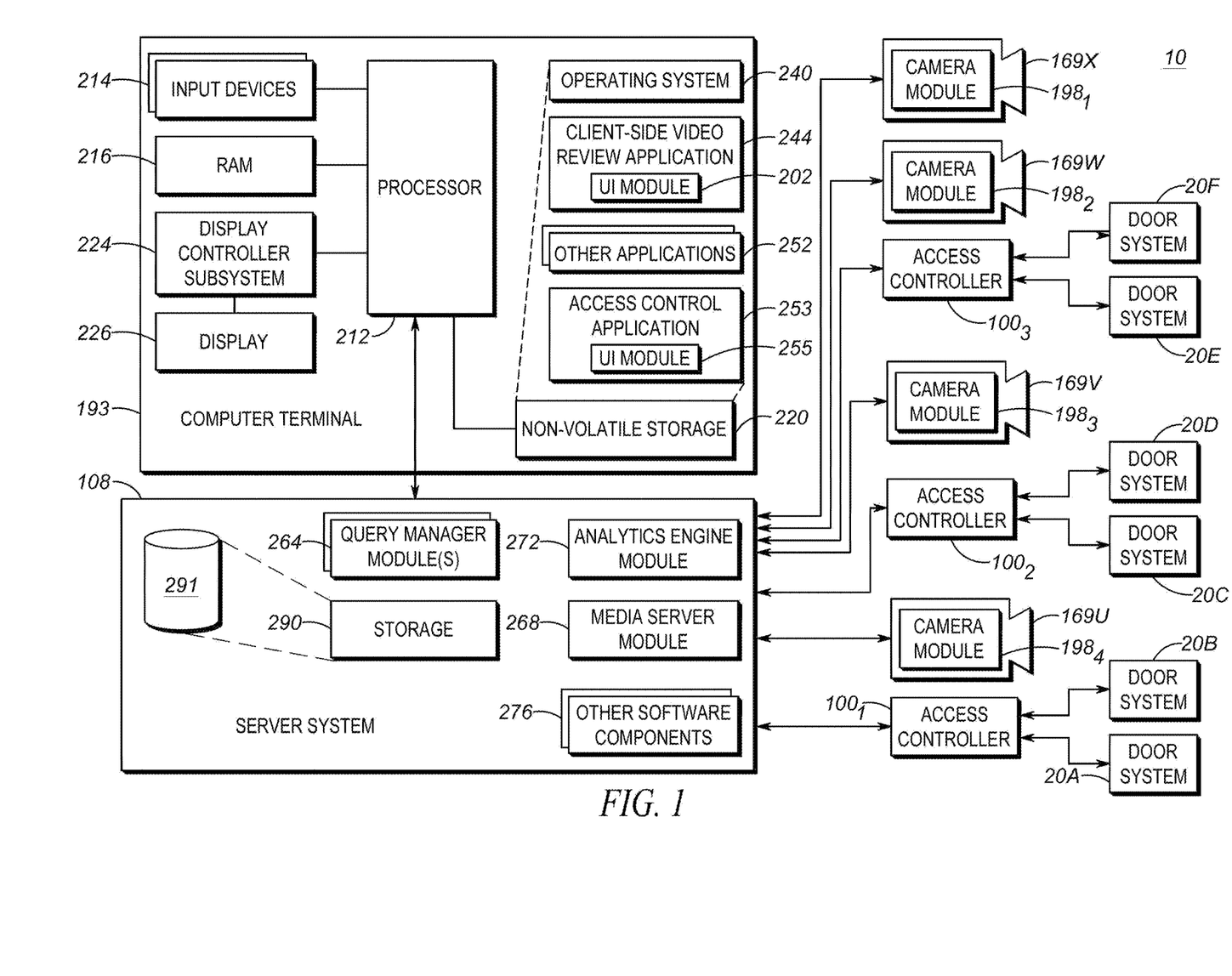
FIG. 1 is a block diagram of a security system according to an example embodiment.

Reference is now made to FIG. 1 which is a block diagram of an example security system 10 within which methods in accordance with example embodiments can be carried out. Included within the illustrated security system 10 (and in which access control is integrated with video capturing) are one or more computer terminals 193 and a server system 108. In some example embodiments, the computer terminal 193 is a personal computer system; however in other example embodiments the computer terminal 193 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. Furthermore, in some examples the server system 108 may be, in whole or in part, a cloud implementation. As will be appreciated by those skilled in the art, at least some of the functionality of the server system 108 can be implemented within the computer terminal 193 rather than within the server system 108.

The computer terminal 193 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 193 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 193 and the server system 108 are within the same Local Area Network (LAN).

The computer terminal 193 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220 and display controller subsystem 224. The display controller subsystem 224 interacts with display 226 and it renders graphics and/or text upon the display 226.

Still with reference to the computer terminal 193 of the security system 10, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 193 is turned off. Regarding the operating system 240, this includes software that manages computer hardware and software resources of the computer terminal 193 and provides common services for computer programs. Also, those skilled in the art will appreciate that the operating system 240, client-side video review application 244, the access control management application 253, and other applications 252, or parts thereof, may be temporarily loaded into a volatile store such as the RAM 216. The processor 212, in addition to its operating system functions, can enable execution of the various software applications on the computer terminal 193.

Still with reference to FIG. 1, the video review application 244 can be run on the computer terminal 193 and includes a User Interface (UI) module 202 for cooperation with a search session manager module and other modules of the video review application 244 in order to enable a computer terminal user to carry out actions related to providing input such as, for example, input to facilitate identifying same individuals or objects appearing in different video recordings. In such circumstances, the user of the computer terminal 193 is provided with a user interface generated on the display 226 through which the user inputs and receives information in relation to the video recordings.

As mentioned, the video review application 244 also includes the search session manager module, which provides a communications interface between the UI module 202 and a query manager module (i.e. a respective one of the one or more query manager modules 264) of the server system 108. In at least some examples, a search session manager module of the application 244 communicates with a respective one of the respective query manager module(s) 264 through the use of Remote Procedure Calls (RPCs).

Besides the query manager module(s) 264, the server system 108 includes several software components for carrying out other functions of the server system 108. For example, the server system 108 includes a media server module 268. The media server module 268 handles client requests related to storage and retrieval of video taken by video cameras 169U, 169V, 169W, 169X ("video cameras 169U-169X") in the security system 10. The server system 108 also includes an analytics engine module 272. The analytics engine module 272 can, in some examples, be any suitable one of known commercially available software that carry out mathematical calculations (and other operations) in support of video analytics and computer vision functionality. In some examples the analytics engine module 272 includes one or more learning machines (such as, for instance, one or more convolutions neural networks). In some examples the analytics engine module 272 can use the descriptive characteristics of the person's or object's appearance. Examples of these characteristics include the person's or object's shape, size, textures and color.

The server system 108 also includes a number of other software components 276. These other software components will vary depending on the requirements of the server system 108 within the overall system. As just one example, the other software components 276 might include special test and debugging software, or software to facilitate version updating of modules within the server system 108. The server system 108 also includes one or more data stores 290. In some examples, the data store 290 comprises one or more databases 291 which facilitate the organized storing of recorded video.

Regarding the video cameras 169U-169X, although four video cameras are shown, any suitable number of video cameras is contemplated. Each of the video cameras 169U-169X includes a respective camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 may include a number of conventional submodules for video analytics, the details of which will be readily understood by those skilled in the art. Optionally, one or more learning machines may reside at the camera (such as, for instance, one or more convolution neural networks). Also consistent with such examples, the camera module 198 may be able to detect humans (or other self-movable objects) and extract images of humans (or other self-movable objects) with respective bounding boxes outlining the objects for inclusion in metadata which, along with the associated video, may transmitted to the server system 108. At the server system 108, the media server module 268 can process extracted images to facilitate generation of, for example, signatures (e.g. feature vectors) to represent objects. Those skilled in the art will appreciate that, besides humans, other examples of self-movable objects include vehicles, animals, certain types of robots, etc.

Still with reference to FIG. 1, illustrated door systems 20A-20F are communicatively linked to the server system 108 through respective access controllers $100_1$-$100_3$. Although six door systems are shown, any suitable number of door systems is contemplated. Similarly, although three access controllers are shown, any suitable number of access controllers is contemplated. Also, the one or more databases 291 can include a credential and policy directory (or alternatively the server system could include a separate storage, i.e. distinct from the data store 290, for the purpose of supporting the credential and policy directory).

As will be understood by those skilled in the art, each of the access controllers $100_1$-$100_3$ may log events, and the logs may be configured via an interface provided by a UI module 255 of access control management application 253 to establish any number of devices, services, and systems as event recipients. Some or all of the access controllers $100_1$-$100_3$ may be configured to send the events to a remote monitoring service in any number of formats including, for example, Simple Network Management Protocol (SNMP), Extensible Markup Language (XML) via direct socket connection (Global System for Mobile Communications (GSM), LAN, Wide Area Network (WAN), WiFi™), Syslog, and through a serial port.

Figure 2:
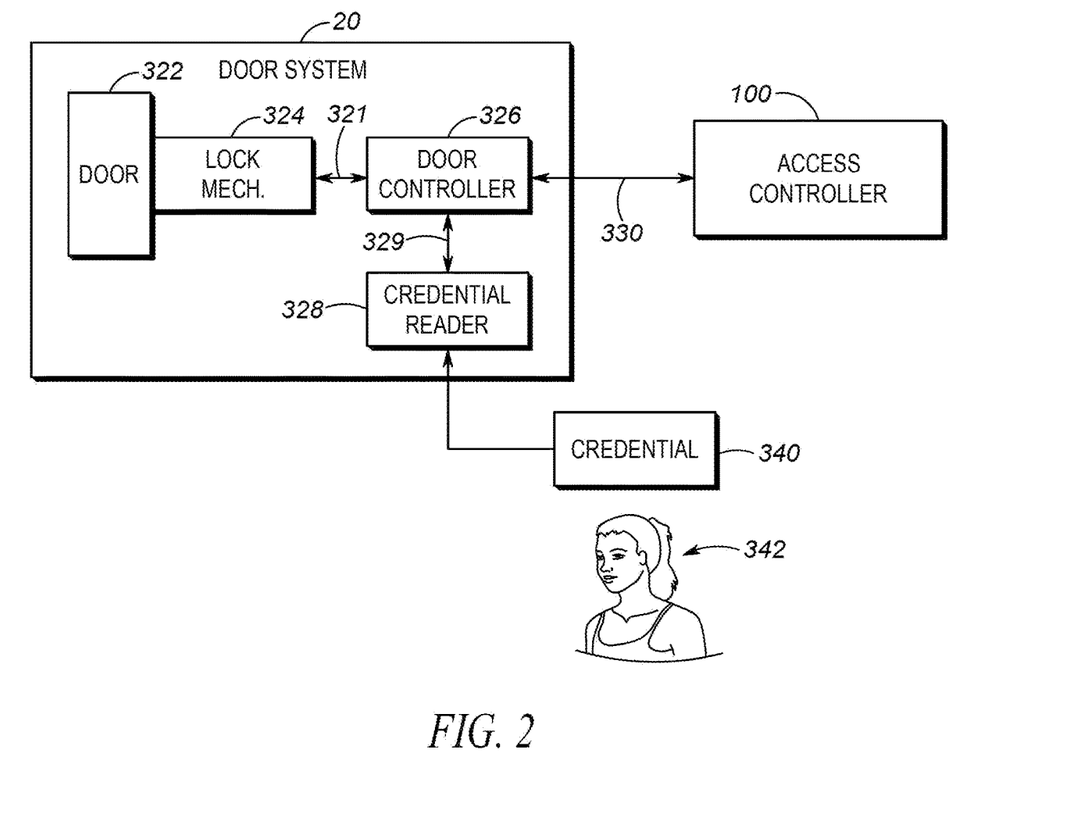
FIG. 2 is another block diagram providing additional detail in relation to the security system of FIG. 1.

Reference is now made to FIG. 2 which shows a block diagram of individual examples of each of the access controllers $100_1$-$100_3$ and the door systems 20A-20F in more detail than that provided in FIG. 1. In FIG. 2, the door system 20 is shown in communication with the access controller 100 over signal path 330. The door system 20 includes access door 322, door locking mechanism 324, door controller 326, and credential reader 328. The door 322 may be any door that allows individuals to enter or leave an associated enclosed area. The door 322 may include a position sensor (for example, a limit switch, which is not shown) that indicates when the door 322 is not fully closed. The position sensor may send a not-fully-closed signal over the signal path 321 to the door controller 326. The not-fully-closed signal may be sent continuously or periodically, and may or may not be sent until after a predefined time has expired.

With respect to the illustrated door system 20, the locking mechanism 324 includes a remotely operated electro-mechanical locking element (not shown) such as a dead bolt that is positioned (locked or unlocked) in response to an electrical signal sent over the signal path 321 from the door controller 326.

The door controller 326 receives credential information over a signal path 329 from the credential reader 328 and passes the information to the access controller 100 over another signal path 330. The door controller 326 receives lock/unlock signals from the access controller 100 over the signal path 330. The door controller 326 sends lock mechanism lock/unlock signals over the signal path 321 to the locking mechanism 324.

The credential reader 328 receives credential information 340 for an individual 342. The credential information 340 may be encoded in a Radio Frequency Identification (RFID) chip, a credential on a smart card, a PIN/password input using a key pad, and biometric data such as fingerprint and retina scan data, for example.

The door system 20 operates based on access request signals sent to the access controller 100 and access authorization signals received, in response, from the access controller 100. The door system 20 may incorporate an auto lock feature that activates (locks) the door 322 within a specified time after the door 322 is opened and then shut, after an unlock signal has been sent to the locking mechanism 324 but the door 322 not opened within a specified time, or under other conditions. The auto lock logic may be implemented in the door controller 326 or the locking mechanism 324.

The door system 20 may send event signals to the computer terminal 193 by way of the access controller 100. Such signals include door open, door closed, locking mechanism locked, and locking mechanism unlocked. As noted above, the signals may originate from limit switches in the door system 20.

It is contemplated that a single door system 20 may be used for both entry and egress. Alternatively, it is also contemplated that one of the door systems 20A-20F may be used only for entry and a separate one of the door systems 20A-20F may be used only for egress.

However configured, the door systems may trigger the event that indicates when an individual 342 enters an enclosed area and when the individual 342 has exited that enclosed area, based on information obtained by reading credential information 340 of the individual 342 on entry and exit, respectively. These signals may be used to prevent reentry without an intervening exit, for example. The presence or absence of these signals also may be used to prevent access to areas and systems within the enclosed area. For example, the individual 342 may not be allowed to log onto his computer in the respective enclosed area in the absence of an entry signal originating from one of the door systems 20 of the respective enclosed area. Thus, the access controller 100 and its implemented security functions may be a first step in a cascading series of access operations to which the individual may be exposed.

The door systems 20A-20F may incorporate various alarms, such as for a propped open door 322, a stuck unlocked locking mechanism 324, and other indications of breach or fault.

Figure 3:
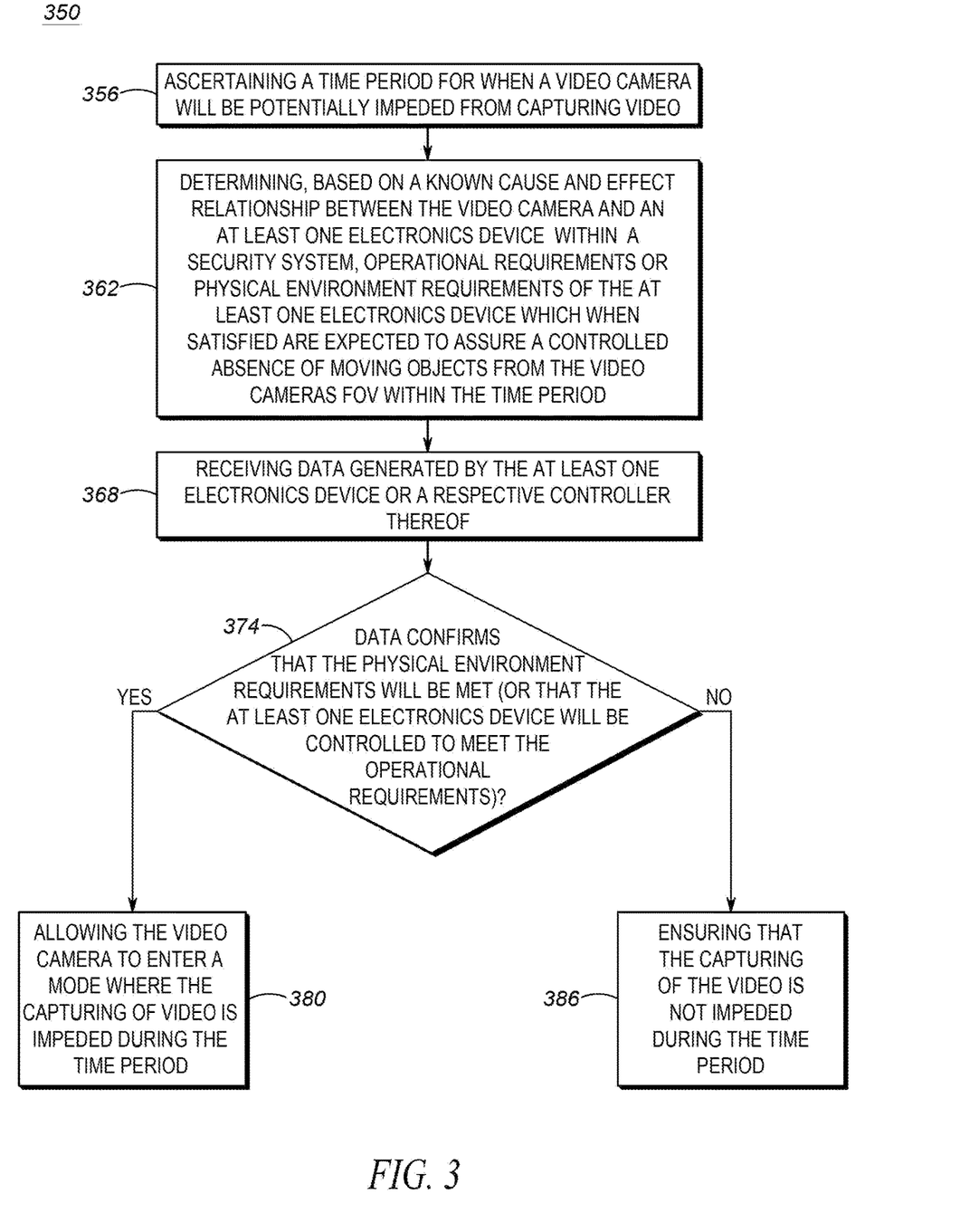
FIG. 3 is a flow chart illustrating a computer-implemented method in accordance with an example embodiment.

Reference is now made to FIG. 3. FIG. 3 is a flow chart illustrating a method 350 in accordance with an example embodiment. (Reference is also made below to FIGS. 4 and 5, which are diagrams of a room 420 that may be protected by a security system in accordance with example embodiments.)

Firstly in the method 350, a time period, defined by both a future start time and a future end time, is ascertained (356). During this time period, a video camera (having an FOV), will be potentially impeded from capturing video. For example, in the diagram of FIG. 4, security camera 410 (which may be a camera similar or corresponding to one of the video cameras 169U-169X) is located in the room 420 and has an FOV 430 which may be impeded from capturing video during the above-mentioned time period (for instance, corresponding to a reboot period of the security camera 410 following a firmware upgrade applied to the security camera 410).

The above-mentioned time period may be any suitable amount of time. For example, the time period may be about 10 seconds, or the time period may be greater than 2 seconds but less than 60 seconds, etc. In some examples, the time period may be at least longer than the overall processing and signal transmission delay involved for device-functionality coordination associated with achieving the desired computer-implement method within the overall security system.

Figure 4:
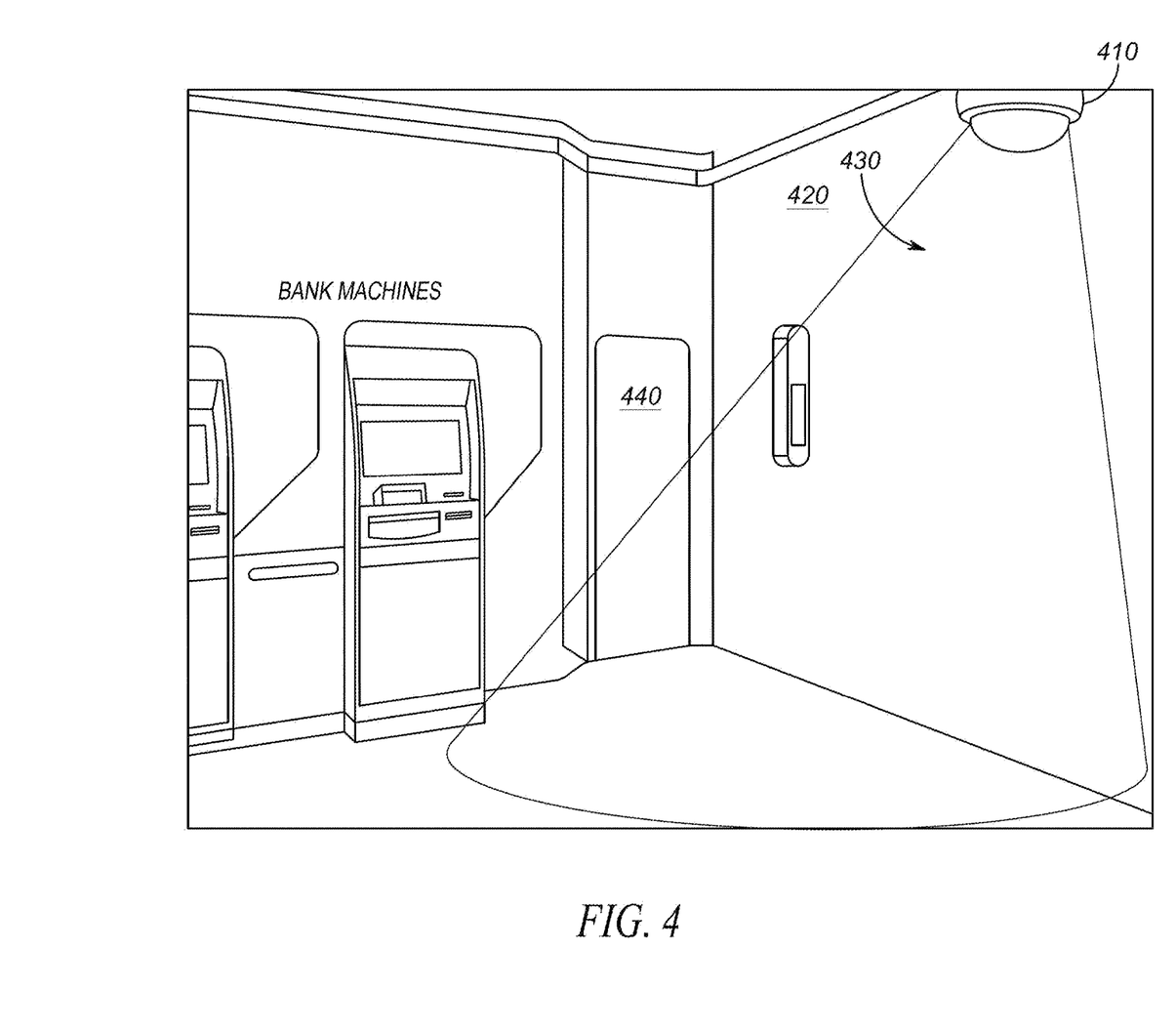
FIGS. 4 and 5 are diagrams of an example room that may be protected by the security system of FIG. 1.
Figure 5:
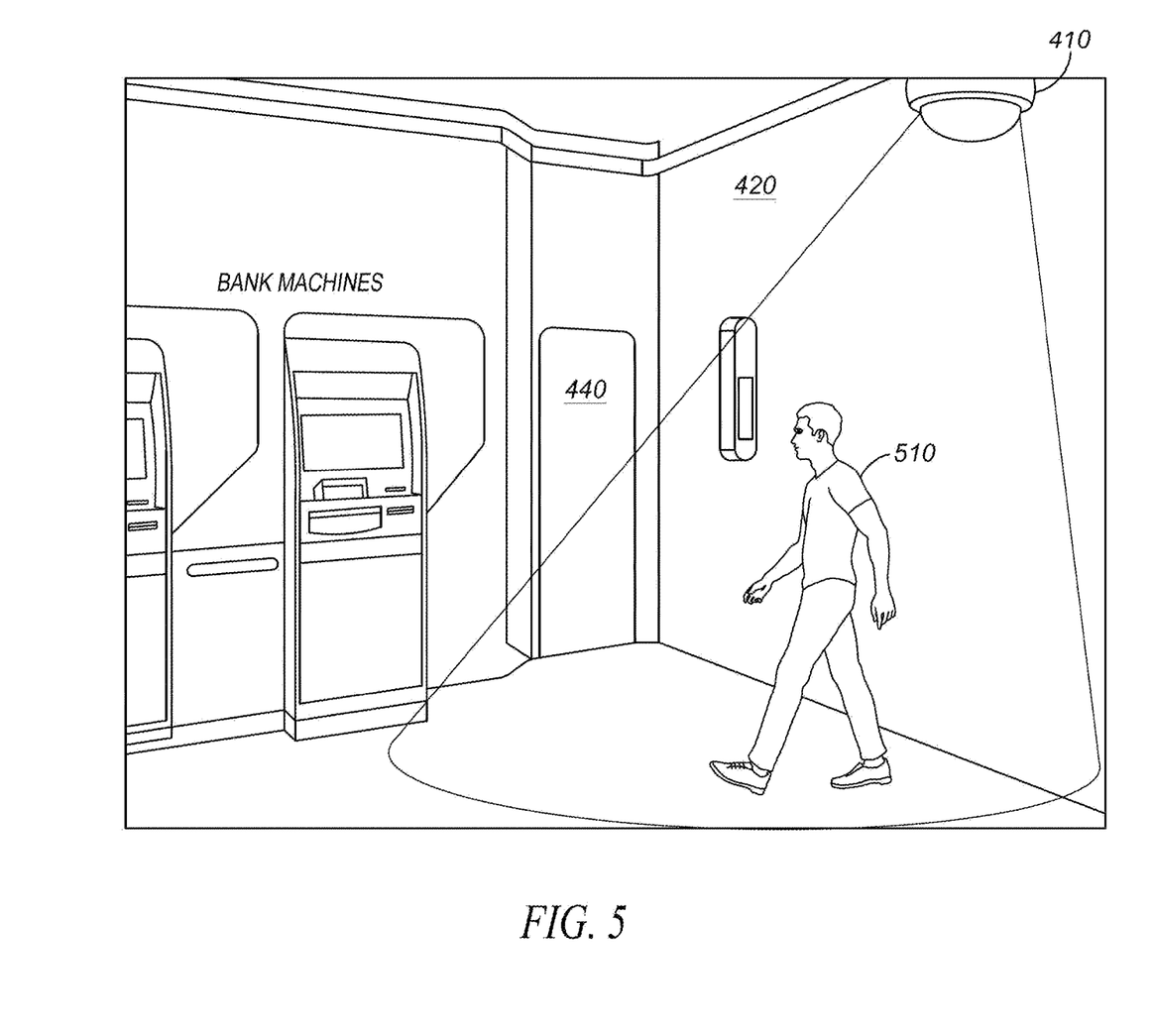

Also, while FIGS. 4 and 5 illustrate a bank machine room, it will be appreciated that other physical environments like hospitals, classrooms, conference rooms, offices, file rooms, evidence rooms, etcetera are contemplated. Also, it will appreciate that example embodiments are not limited to just rooms, and that other suitable environments like elevators, trams, etcetera are also contemplated.

Next in the method 350, based on a known cause and effect relationship between the video camera and an at least one electronics device within a security system, operational requirements or physical environment requirements of the at least one electronics device are determined (362). The operational requirements or physical environment requirements of the least one electronics device are, when satisfied, expected to support a controlled absence of moving objects from the FOV within the time period.

For example, the at least one electronics device within the security system may be the door controller 326 (FIG. 2). In respect of such an example, the operational requirements may include controlling the door controller 326 to keep a corresponding at least one lockable door (for instance, door 440) in lockdown for a duration of an additional time period as specified by the operational requirements. (It will be understood that, regarding the illustrated door 440, this may be similar or correspond to the door 322 shown in FIG. 2). Also consistent with this example, and in response to expiry of the previously mentioned time period, a message, addressed to the door controller 326, may be transmitted from somewhere else within the security system 10 (for instance, from the server system 108 or from the security camera 410). Such a message is to provide notification that the door 440 need no longer be maintained in lockdown.

When the door 440 is kept in lockdown for the above-described additional time period, it is contemplated that the door 440 may be unlockable by no one. Alternatively, the door 440 may be only unlockable by a reduced subset of a plurality of credential holders who are normally able to unlock the door 440.

While the at least one electronics device that possesses the appropriate known cause and effect relationship with the security camera 410 may be certain physical access control hardware as described above, the at least one electronics device can alternatively be something other than physical access control hardware. For example, the at least one electronics device may be a different one of the video cameras 169U-169X than the video camera corresponding to the security camera 410. In such an example, the physical environment requirements of the different one of the video cameras 169U-169X may be that no self-movable objects are detected within the respective FOV of the different one of the video cameras 169U-169X at least at a specified time. Alternatively, instead of a requirement of no self-movable objects in the FOV of just one additional camera (for instance, just one additional camera located right outside of the room 420), the requirement may be instead for no self-movable objects in the FOVs of a plurality of additional cameras.

Continuing on in respect of the method 350, data generated by the at least one electronics device or a respective controller thereof is received (368).

Next in the method 350 is decision action 374, where a different action follows depending on whether or not the data confirms that the physical environment requirements will be met (or that the at least one electronics device will be controlled to meet the operational requirements).

If "YES", then action 380 follows the decision action 374, and the video camera is allowed to enter a mode where the capturing of the video is impeded during the time period.

If "NO, then action 386 follows the decision action 374, and the security system 10 will ensure that the capturing of the video is not impeded during the time period.

In some examples, ensuring that there is a controlled absence of moving objects from the FOV of the impacted camera includes counting objects within some enclosed area that is monitored by that camera. For instance, this may include employing at least one of person recognition analytics and people counting analytics to determine, prior to the entering of the mode where the capturing of the video is impeded, that there are no people in the room 420 that is monitored by the security camera 410. For instance, the condition of the room 420 in FIG. 4 with no people in it may be acceptable, as contrasted to the state of the room 420 in FIG. 5 where person 510 is present (unacceptable). Those skilled in the art will appreciate that for the security system 10 of FIG. 1, the analytics engine 272, or video analytics of one of the camera modules $198_1$-$198_4$, or some combination of both of these may be tasked with the person recognition analytics and/or the people counting analytics.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot automate selective impeding of video capture within a security system, among other features and functions set forth herein).

In the foregoing specification, specific embodiments have been described. However, one of ordinary skill in the art appreciates that various modifications and changes can be made without departing from the scope of the invention as set forth in the claims below. For example, in terms of the cause for impeding the capturing video during a time period, the example was provided of a reboot period of a security camera following a firmware upgrade applied to that security camera; however other use cases are contemplated. For instance, following a disruptive AC power outage impacting the entire site where a security system is located, backup battery power might be conserved by implementing rolling shutdowns (off periods) for subsets of video cameras until such time as AC power is restored to the site.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a LAN or a WAN, or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    ascertaining a time period, defined by both a future start time and a future end time, for when a video camera, having a Field Of View (FOV), will be potentially impeded from capturing video;
    determining, using at least one processor and based on a known cause and effect relationship between the video camera and an at least one electronics device within a security system, operational requirements or physical environment requirements of the least one electronics device which when satisfied are expected to support a controlled absence of moving objects from the FOV within the time period;
    receiving data generated by the at least one electronics device or a respective controller thereof;
    when the data confirms that the physical environment requirements will be met or confirms that the at least one electronics device will be controlled to meet the operational requirements, allowing the video camera to enter a mode where the capturing of the video is impeded during the time period; and
    when the data indicates that the physical environment requirements will not be met or that the at least one electronics device will not be controlled to meet the operational requirements, ensuring that the capturing of the video is not impeded during the time period.

2. The computer-implemented method of claim 1 wherein the at least one electronics device within the security system is an at least one door controller, and the operational requirements include controlling the at least one door controller to keep a corresponding at least one lockable door in lockdown for a duration of an additional time period as specified by the operational requirements.

3. The computer-implemented method of claim 2 further comprising transmitting a message, in response to expiry of the time period and addressed to the at least one door controller, wherein the message provides notification that the at least one lockable door need no longer be maintained in lockdown.

4. The computer-implemented method of claim 2 wherein the at least one lockable door provides access to an area corresponding to the FOV of the video camera.

5. The computer-implemented method of claim 2 wherein during the additional time period the at least one lockable door is only unlockable by a reduced subset of a plurality of credential holders who are normally able to unlock the at least one lockable door.

6. The computer-implemented method of claim 1 wherein the at least one electronics device within the security system is one or more additional video cameras, and the physical environment requirements of the one or more additional video cameras include that no self-movable objects are detected within respective one or more FOVs of the one or more additional video cameras at least at a specified time.

7. The computer-implemented method of claim 1 wherein the time period corresponds to a reboot period of the video camera following a firmware upgrade applied to the video camera.

8. The computer-implemented method of claim 1 wherein the time period is of a duration lasting more than two seconds, but less than sixty seconds.

9. The computer-implemented method of claim 1 further comprising employing at least one of person recognition analytics and people counting analytics to determine, prior to the entering of the mode where the capturing of the video is impeded, that there are no people in an enclosed area that is monitored by the video camera.

10. The computer-implemented method of claim 1 wherein the controller of the at least one electronics device is an access controller communicatively coupled to the at least one electronics device that is attached to a corresponding at least one lockable door.

11. The computer-implemented method of claim 1 wherein the moving objects are one or more of people, vehicles and animals.

12. Apparatus comprising:
at least one processor configured to receive data generated by an at least one electronics device within a security system, or generated by a respective controller of the at least one electronics device;
a video camera having a Field Of View (FOV) and communicatively coupled to the at least one processor; and
at least one electronic storage medium storing program instructions that when executed by the at least one processor cause the at least one processor to perform:
ascertaining a time period, defined by both a future start time and a future end time, for when the video camera will be potentially impeded from capturing video;
determining, based on a known cause and effect relationship between the video camera and the at least one electronics device, operational requirements or physical environment requirements of the least one electronics device which when satisfied are expected to support a controlled absence of moving objects from the FOV within the time period;
when the data confirms that the physical environment requirements will be met or confirms that the at least one electronics device will be controlled to meet the operational requirements, allowing the video camera to enter a mode where the capturing of the video is impeded during the time period; and
when the data indicates that the physical environment requirements will not be met or that the at least one electronics device will not be controlled to meet the operational requirements, ensuring that the capturing of the video is not impeded during the time period.

13. The apparatus of claim 12 wherein the apparatus includes the at least one electronics device which is an at least one door controller, and the operational requirements include controlling the at least one door controller to keep a corresponding at least one lockable door in lockdown for a duration of an additional time period as specified by the operational requirements.

14. The apparatus of claim 13 wherein:
the at least one door controller is configured to receive, contemporaneous with expiry of the time period, a message addressed thereto, and
the message provides notification that the at least one lockable door need no longer be maintained in lockdown.

15. The apparatus of claim 13 wherein the apparatus further includes the at least one lockable door that provides access to an area corresponding to the FOV of the video camera.

16. The apparatus of claim 13 wherein during the additional time period the at least one lockable door is only unlockable by a reduced subset of a plurality of credential holders who are normally able to unlock the at least one lockable door.

17. The apparatus of claim 12 wherein the apparatus includes the at least one electronics device which is one or more additional video cameras, and the physical environment requirements of the one or more additional video cameras include that no self-movable objects are detected within respective one or more FOVs of the one or more additional video cameras at least at a specified time.

18. The apparatus of claim 12 wherein the time period corresponds to a reboot period of the video camera following a firmware upgrade applied to the video camera.

19. The apparatus of claim 12 wherein the at least one processor is further caused to perform at least one of person recognition analytics and people counting analytics to determine, prior to the entering of the mode where the capturing of the video is impeded, that there are no people in an enclosed area that is monitored by the video camera.

20. The apparatus of claim 12 wherein the controller of the at least one electronics device is an access controller communicatively coupled to the at least one electronics device that is attached to a corresponding at least one lockable door.

* * * * *